O. G. PARKER.
BED.
APPLICATION FILED FEB. 18, 1922.
1,433,741.
Patented Oct. 31, 1922.
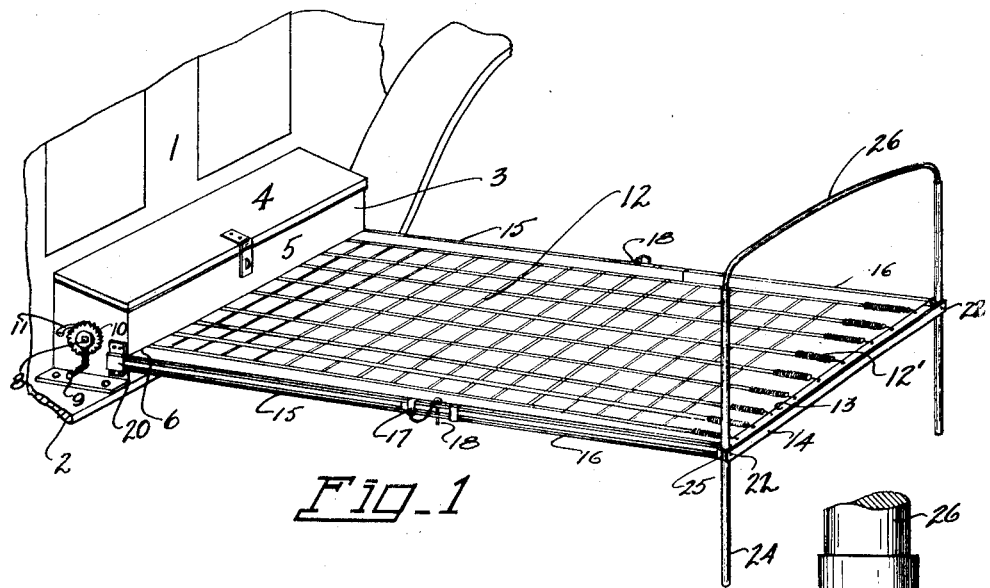
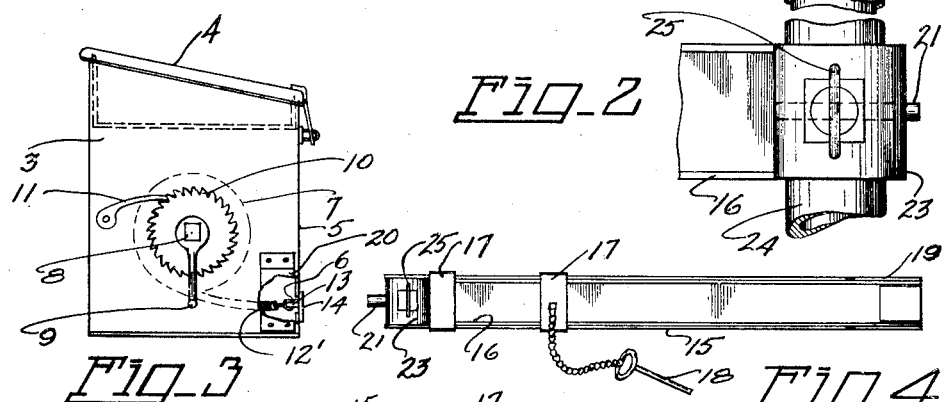
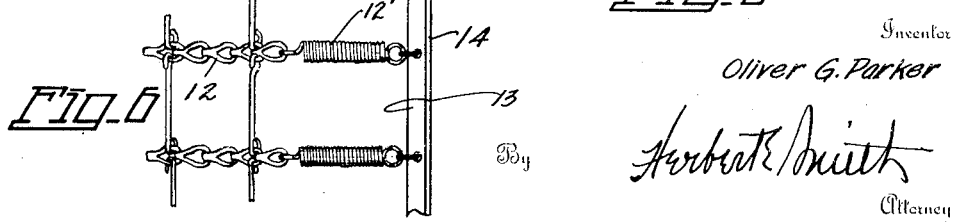
Inventor
Oliver G. Parker
By Herbert E. Smith
Attorney Patented Oct. 31, 1922.

1,433,741

UNITED STATES PATENT OFFICE.

OLIVER G. PARKER, OF SPOKANE, WASHINGTON.

BED.

Application filed February 18, 1922. Serial No. 537,515.

*To all whom it may concern:*

Be it known that I, OLIVER G. PARKER, a citizen of the United States, residing at Spokane, in Spokane County, and State of Washington, have invented certain new and useful Improvements in Beds, of which the following is a specification.

My present invention relates to improvements in beds of that class known as vehicle-attached beds, designed primarily for use in connection with automobiles as part of a camping outfit and for tourists' use. By the utilization of the subject matter of my invention the tourist may with convenience and facility prepare the bed for use, and with equal facility store the entire apparatus within a housing carried on the running board of the automobile. The housing also performs the function of supporting the bed when set up, in connection with detachable or take-down posts or legs. The invention consists in certain novel combinations and arrangements of parts whereby the bed, when dissociated may be compactly stored within a comparatively small space within the housing, and when set up provides a strong and stable support for the purpose required. The parts may be produced at comparatively slight expense, are simple in construction, and readily assembled or dismantled.

In the accompanying drawings I have illustrated one complete example of the physical embodiment of my invention in connection with a housing on the running board of an automobile, wherein the parts are combined and arranged according to the best mode I have thus far devised for the practical application of the principles of my invention.

Figure 1 is a perspective view showing so much as is required of an automobile for illustrating the housing on the running board thereof, and illustrating the bed ready for use, except for the mattress.

Figure 2 is an enlarged detail view of one of the joints between the side rails, post or leg and connecting rod at the foot of the bed.

Figure 3 is an end view of the housing, partly broken away, with the equipment stored therein.

Figure 4 is a side view of one of the sections of the telescoping side rails of the bed.

Figure 5 is a view showing one of the side rails with its sections extended and coupled, part being broken away.

Figure 6 is an enlarged detail of the flexible bed spring.

In order that the invention may readily be understood I have illustrated a portion of the body 1 of an automobile of any well known make and provided with the usual running board 2 at its side. Upon the running board is securely attached a housing 3, preferably of rectangular shape, and of sufficient capacity to accommodate all of the parts forming the bed equipment. By opening the hinged cover 4 access may be had to the interior of the housing for removing or storing the separate parts of the bed. In the front wall 5 of the housing is provided a longitudinally extending slot 6, located near the bottom thereof, and extending from end to end. Within the housing is a longitudinally disposed and rotatable reel 7 having a shaft 8 which at its ends is journaled in bearings on the ends of the housing, and by means of an exterior crank handle 9 on the shaft, the shaft and reel may be revolved. A ratchet wheel 10 and its pawl 11 are designed to prevent undesired back movement of the shaft and reel, and also to hold the reel against movement when supporting the extended bed spring 12. The spring 12, which is attached at one end to the reel within the housing may be of any suitable, flexible type and made up of longitudinal chains and cross links, and may be provided with coiled springs 12′ interposed between the bed spring and its end crossbar 13. The bed spring is passed through the slot 6 of the housing, and a portion of the spring remains at all times within the slot. The cross bar 13 is preferably a metal T-bar having a vertically disposed flange 14, which, when the bed is stored, as in Figure 3, closes the slot 6, with the horizontal flange of the bar 13 filling the space of the slot. The slot is thus closed against dust, rain or snow by the cross bar when the bed is stored, and the slotted wall forms a long bearing or support for the bed spring when the latter has been pulled from the housing to extended position for use.

The bed is equipped with a pair of sectional, telescopic side rails that are detachable and each composed of two sections as 15 and 16, of channel iron bars, adapted to slide one within another for storing in the housing, and with equal facility adapted to be extended for use. Each section of the side rails is provided with a loop or guide sleeve 17, and each side rail has a coupling pin 18 which is passed through openings in the flanges of the channel bars that register for the purpose, to hold the sections of the rails in extended position. At the inner end of each section 15 a flat plate 19 is fashioned, by omitting the flanges, and these plates are adapted to seat in sockets or metallic cleats 20, one located on the exterior of each end of the housing.

The bed spring and the side rails are connected together at the foot of the bed by means of projecting pins 21 one at the end of each of the rail sections 16, which fit into transverse openings or holes 22 near the ends of the cross bar 13.

At the outer ends of each of the sections 16 of the side rails is provided a vertically disposed socket or sleeve 23, located at the outer side of the rail member and adapted to receive a hollow post or leg 24, and the parts may be rigidly held together by a set screw or clamp screw 25 threaded through each sleeve and adapted to frictionally engage a leg or post. At their upper ends these hollow posts are connected by a connecting rod 26, which, in addition to forming a rigid connection between the hollow posts, may be used as a support for one end of a canopy.

From the above description, taken in connection with my drawings, it will be apparent that the separated parts are stored within the housing 3, when not in use. When required for use, the side rails, posts, and connecting rod, (after the lid 4 of the housing has been opened,) are removed. The pairs of rail sections are extended and coupled together and the flat plates 19 of the rails are inserted in their sockets or cleats 20 as supports. The posts are now passed through the socket sleeves, and after being properly adjusted to adapt them to the irregularities of the ground, the set screws are turned home to clamp the rails and posts together, after which the arched connecting rod is inserted in the open tops of the hollow posts to form a rigid support for the bed spring. By grasping the cross bar 13 of the spring, after the pawl 11 has been released, the bed spring may be pulled and unwound from the reel, the spring passing through the guide slot 6 of the housing, and then the pins 21 are utilized as anchors for the spring by slipping the perforated ends of the cross bar 13 over these pins. The pawl 11 may now be turned back to engage the ratchet wheel, and the whole equipment is formed as a rigid and strong structure, it being apparent that the long bearing or support for the bed spring formed by the wall of the slot 6 will hold the spring in stable position at one end, while the cross bar 13 and pins 21 will afford a stable support at the foot of the bed. The usual mattresses or blankets, or cushions may be employed to make the bed comfortable. The process of taking down and storing the bed will be apparent and needs no description; the advantages of this construction of vehicle-attached bed will be apparent, and it is obvious that a meritorious structure is embodied in my invention.

Having thus fully described my invention, what I claim and desire to secure by Letters Patent is—

The combination in a vehicle-attached bed with a housing having a slotted front wall, of a reel within the housing, a flexible bed spring attached to said reel and passed through the slotted wall whereby the bed spring is supported when extended, a cross bar attached to the free end of said bed spring adapted to close the slotted wall when the bed spring is housed, side rails detachably connected to the housing, pins at the free ends of said rails to engage perforations in said cross bar, hollow posts detachably secured to said side rails, and a connecting rod having its ends inserted in said hollow posts.

In testimony whereof I affix my signature.

OLIVER G. PARKER.